United States Patent [19]

Knapp et al.

[11] Patent Number: 6,084,700
[45] Date of Patent: Jul. 4, 2000

[54] REFLECTANCE CONTROL OF AN ELECTROCHROMIC ELEMENT USING A VARIABLE DUTY CYCLE DRIVE

[75] Inventors: Robert Charles Knapp, Coloma; Robert Ralph Turnbull, Holland; Gerald Bruce Poe, Hamilton, all of Mich.

[73] Assignee: Gentex Corporation, Zeeland, Mich.

[21] Appl. No.: 09/067,977

[22] Filed: Apr. 29, 1998

[51] Int. Cl.[7] ................................................ G02F 1/163
[52] U.S. Cl. .......................... 359/265; 359/267; 359/603; 359/604
[58] Field of Search ................................ 359/265, 267, 359/275, 603, 604, 614; 345/105

[56] References Cited

U.S. PATENT DOCUMENTS

| | | | |
|---|---|---|---|
| 4,060,975 | 12/1977 | Yamaguchi | 359/265 |
| 4,074,256 | 2/1978 | Sekiya et al. | 340/336 |
| 4,096,412 | 6/1978 | Sekiya | 315/169 |
| 4,516,120 | 5/1985 | Sakuyama | 340/785 |
| 5,076,673 | 12/1991 | Lynam et al. | 359/271 |
| 5,486,952 | 1/1996 | Nagao et al. | 359/603 |

FOREIGN PATENT DOCUMENTS 0 869 032 A2   4/1998   European Pat. Off. .

*Primary Examiner*—Scott J. Sugarman
*Assistant Examiner*—Margaret Burke
*Attorney, Agent, or Firm*—Brian J. Rees; Fitch, Even, Tabin & Flannery

[57] ABSTRACT

An electronic circuit for an electrochromic element. In order to improve the response time of the electrochromic element and reduce the cost and complexity, a modulated signal, such as a pulse width modulated (PWM) signal is coupled to the electrochromic element without signal averaging. In order to compensate for the compressed operating range of the reflectance characteristic under such conditions, the electronic circuit in accordance with the present invention utilizes active loading or alternatively voltage feedback of the electrochromic element to provide a reflectance response characteristic with an uncompressed linear operating range similar to a reflectance characteristic for an electrochromic element with a DC drive circuit.

21 Claims, 4 Drawing Sheets

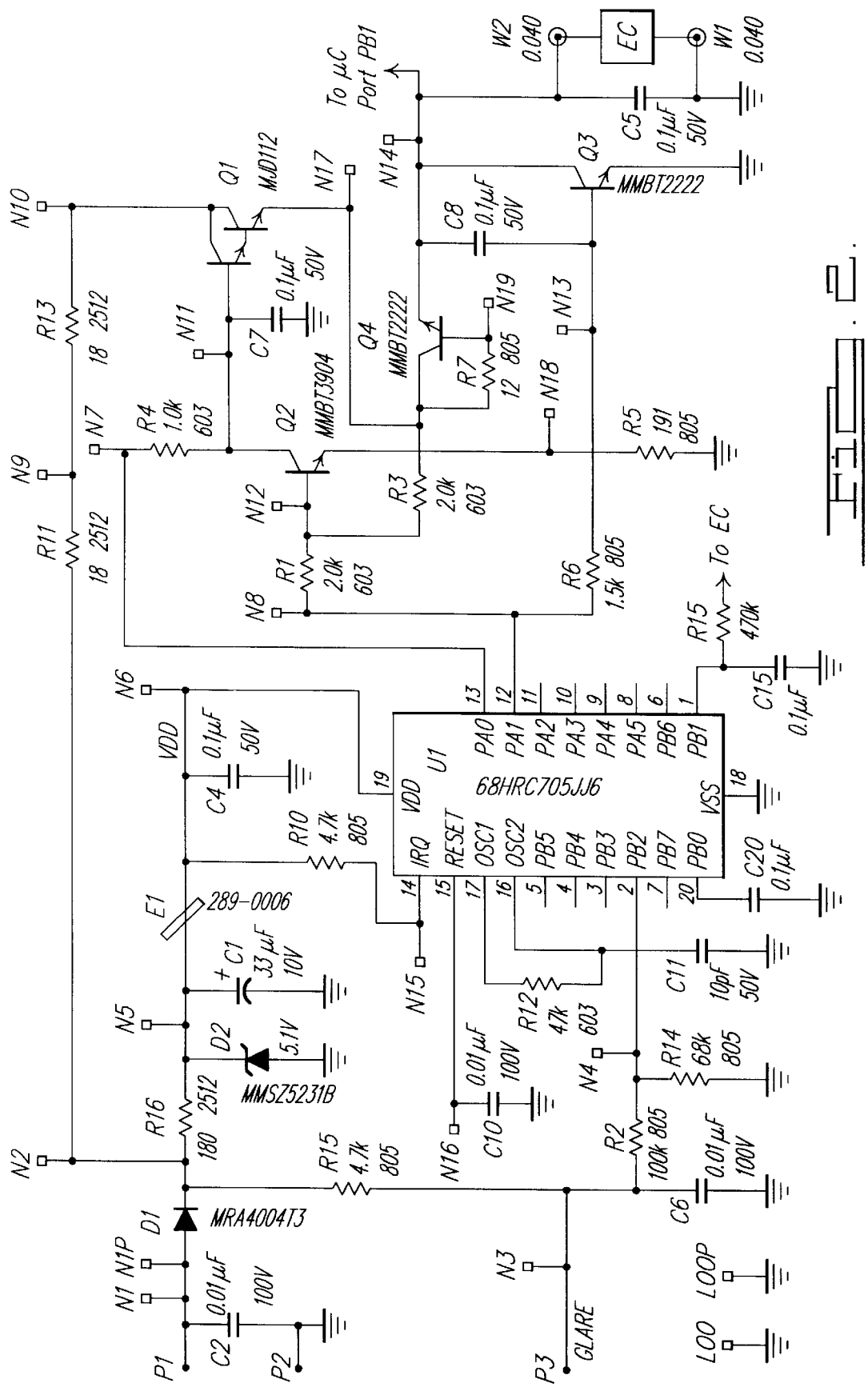

REFLECTANCE CONTROL OF AN ELECTROCHROMIC ELEMENT USING A VARIABLE DUTY CYCLE DRIVE

CROSS REFERENCE TO RELATED APPLICATIONS

This application is related to co-pending patent application, International Application No. PCT/US97/169465, International filing date, Sep. 16, 1997, entitled: "INDIVIDUAL MIRROR CONTROL SYSTEM", assigned to the same assignee of the present invention.

BACKGROUND OF THE INVENTION

1. Field of the Invention

The present invention relates to an electronic circuit for driving an electrochromic element which utilizes fewer components; is less expensive to manufacture and provides a relatively better response time than known DC drive circuits for such electrochromic elements and more particularly to a drive circuit which generates a modulated signal, such as a pulse width modulated signal (PWM), without signal averaging which utilizes active loading or alternatively feedback of the electrochromic element to provide a reflectance response characteristic with an uncompressed linear range similar to a reflectance response characteristic for an electrochromic element with a DC drive circuit.

2. Description of the Prior Art

Various electrochromic mirror and window systems (herein after "electrochromic elements") are generally known in the art. Such systems normally include one or more electrochromic elements. For example, in automotive applications, electrochromic elements are known to be used for both the rearview mirror and one or more of the sideview mirrors. Electrochromic elements are also known to be used in window applications for sun load and privacy control.

It is known that the reflectance of an electrochromic element is a function of the voltage applied to the electrochromic element, for example, as generally described in U.S. Pat. No. 4,902,108, assigned to the same assignee as the assignee of the present invention and hereby incorporated by reference. Because of this characteristic, such electrochromic elements are known to be used to automatically control glare from external light sources in various automotive and non-automotive applications.

As discussed in copending U.S. patent application, Ser. No. 08/825,768, filed on Apr. 2, 1997, assigned to the same assignee of the present invention and hereby incorporated by reference, such electrochromic elements are known to be driven by a DC voltage source. More particularly, as discussed in detail in the aforementioned co-pending patent application, a pulse width modulated (PWM) signal is normally used as a glare control signal in order to control the reflectance level of the electrochromic element. In order to convert the PWM glare control signal to a DC signal for controlling the electrochromic element, a relatively large (i.e., 10 $\mu$f) electrolytic capacitor is used to average the PWM signal and provide a DC signal for controlling the electrochromic element.

There are several disadvantages associated with the use of the electrolytic capacitor for PWM signal averaging. First of all, the electrolytic capacitor adds to the part count of the circuitry and thus, increases the complexity as well as the cost of the circuit. Secondly, the electrolytic capacitor increases the overall response time. Thus, the response time of the element is a function of the electrolytic capacitor as well as the characteristics of the electrochromic element The capacitance provided by the electrolytic capacitor thus increases the response time of the EC system. As discussed below, drive circuits for electrochromic elements which do not utilize such averaging capacitors have not heretofore been known to be used. In particular, the complex load presented by the electrochromic element has not heretofore been known to be driven by a PWM signal without signal averaging because of the compressed operating range of the reflectance characteristic of an electrochromic element when driven by such a PWM signal. More particularly, with reference to FIG. 1, the curve 1a represents an exemplary reflectance characteristic for an electrochromic element that is driven by a DC control signal is illustrated. As shown, the operating range represents that range of voltages where the reflectance characteristic is linear. As shown in the exemplary characteristic, the operating range spans from, for example, 0.4 to 1.0 volts. Such an operating range is sufficient to provide adequate control of the electrochromic element.

The curve 1b in FIG. 1 illustrates an exemplary reflectance characteristic of an electrochromic element that is driven by a PWM without signal averaging. As shown, the operating range is significantly compressed relative to the operating range illustrated by the curve 1a. As shown, the linear operating range of the exemplary reflectance characteristic of the curve 1b is compressed between 10% and 20% of the duty cycle of the PWM signal. The compressed range of the operating range illustrated in by the curve 1b is inadequate to provide adequate control of the reflectance characteristic of the electrochromic mirrors. As such, such electrochromic mirrors have utilized signal averaging capacitors forming DC drive circuits at the expense of the added complexity, cost and slower response time of the DC drive circuits for such electrochromic elements.

SUMMARY

It is an object of the present invention to solve various problems associated with the prior art.

It is yet a further object of the present invention to provide an electronic circuit for driving an electrochromic element which provides a relatively faster response time than known DC drive circuits for such electrochromic elements.

It is yet a further object of the present invention to provide an electronic circuit for driving an electrochromic element that is less complex than known DC drive circuits.

It is yet a further object of the present invention to provide an electronic circuit for driving an electrochromic element which has a reflectance characteristic with an operating range similar to that of DC driven electrochromic element circuits.

Briefly, the present invention relates to an electronic circuit for an electrochromic element. In order to improve the response time of the electrochromic element and reduce the cost and complexity, a modulated signal, such as a pulse width modulated (PWM) signal is coupled to the electrochromic element without signal averaging. In order to compensate for the compressed operating range of the reflectance characteristic under such conditions, the electronic circuit in accordance with the present invention utilizes active loading or alternatively voltage feedback of the electrochromic element to provide a reflectance response characteristic with an uncompressed linear operating range similar to a reflectance characteristic for an electrochromic element with a DC drive circuit.

BRIEF DESCRIPTION OF THE DRAWING

These and other objects of the present invention will be readily understood with reference to the following specification and attached drawing, wherein:

FIG. 2 is a schematic diagram of one embodiment of an electronic circuit for providing a PWM signal without averaging to drive an electrochromic element which utilizes active loading to provide a reflectance characteristic with an operating range similar to that of a electrochromic element driven by a DC signal.

FIG. 6a is a flow chart for an input routine for an alternate embodiment of the invention which utilizes voltage feedback.

FIG. 6b is a flow chart for PWM for an alternate embodiment of the invention which utilizes voltage feedback.

DETAILED DESCRIPTION

The present invention relates to an electronic drive circuit for an electrochromic element driven by a modulated signal, such as a pulse width modulated signal which does not incorporate averaging of the modulated signal before the modulated signal is applied to the electrochromic element. As discussed above, such modulated signals have not heretofore been used to drive electrochromic elements because of the compressed operating range of the reflectance characteristics of the electrochromic elements when driven by such modulated signals. The electronic circuit in accordance with the present invention provides modulation control of the electrochromic element without modulated signal averaging while compensating for the compressed operating range of the reflectance characteristics of the electrochromic elements by either active loading or voltage feedback as will be discussed below. As discussed above, by utilizing a modulated signal without averaging for driving an electrochromic element, the part count as well as the complexity of the drive circuitry for the electrochromic element is minimized while providing an improved response time.

Although the present invention is discussed in terms of pulse width modulation, other modulation techniques, such as pulse-frequency-modulation and pulse phase modulation or any other modulation technique in which the modulated waveform can be averaged and form a drive signal for an electrochromic element, such as frequency modulation, sine wave modulation and triangular modulation may also be used and are considered to be equivalent. All of such modulation techniques are considered to be within the broad scope of the invention.

Figure 3:
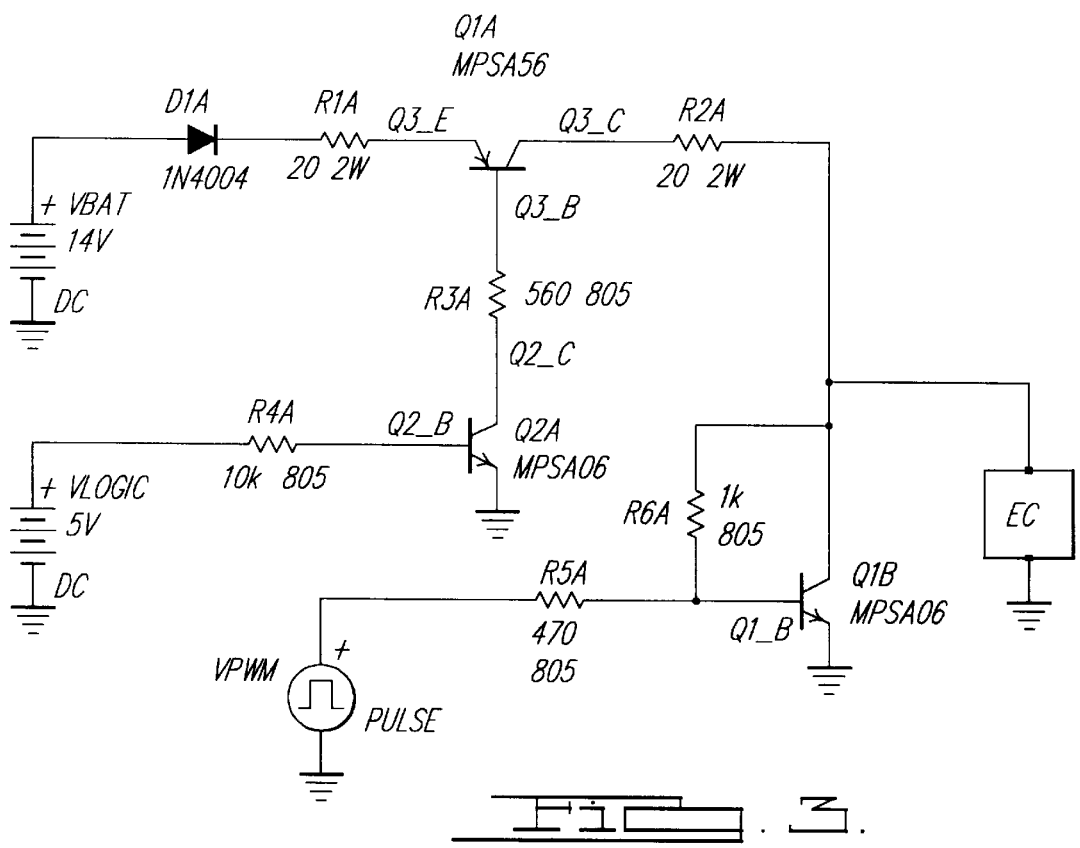
FIG. 3 is an alternate embodiment of the invention illustrated in FIG. 2.
Figure 5A:
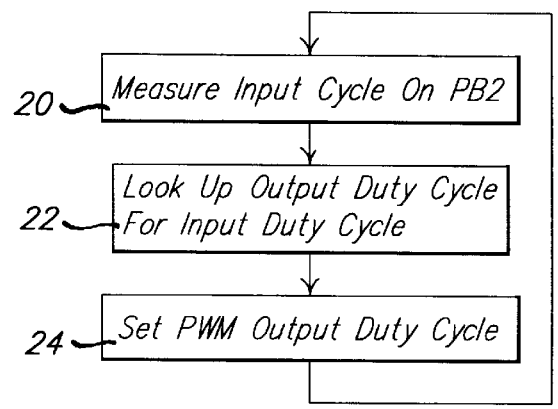
FIG. 5a is a flow chart for an input routine in accordance with one embodiment of the invention which utilizes active loading of the electrochromic element.
Figure 5B:
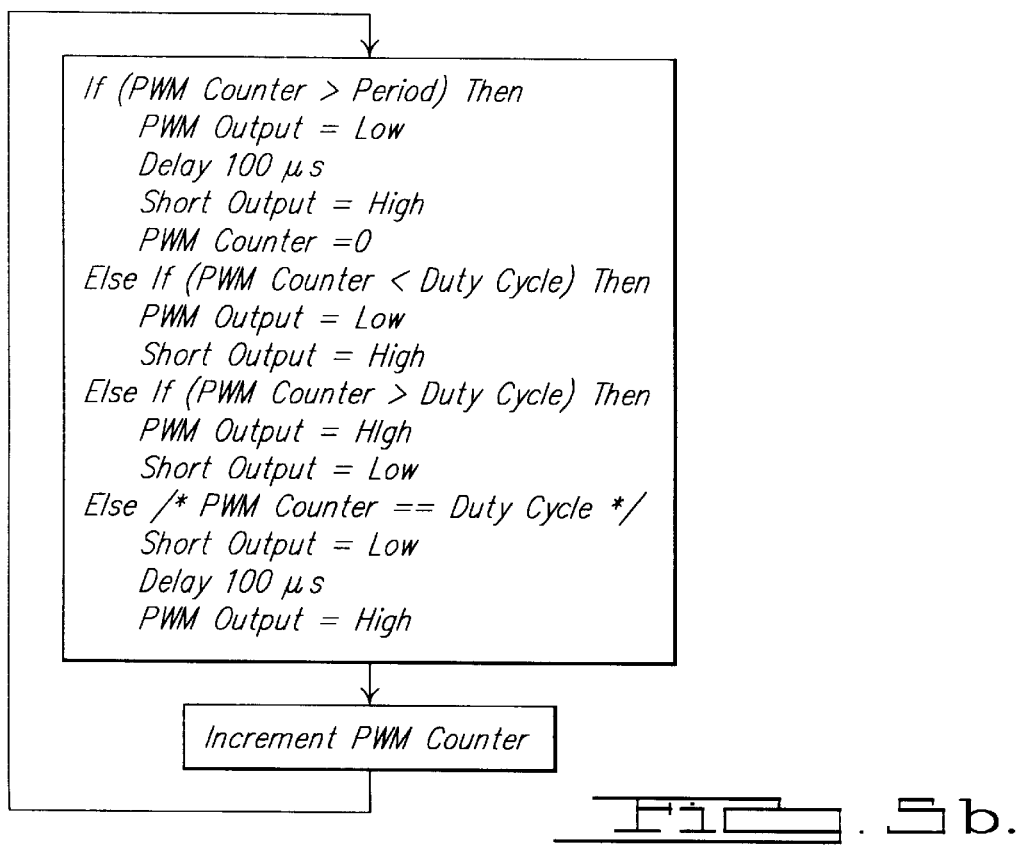
FIG. 5b is a flow chart of a software PWM in accordance with an embodiment of the invention which utilizes active loading.
Figure 5A:
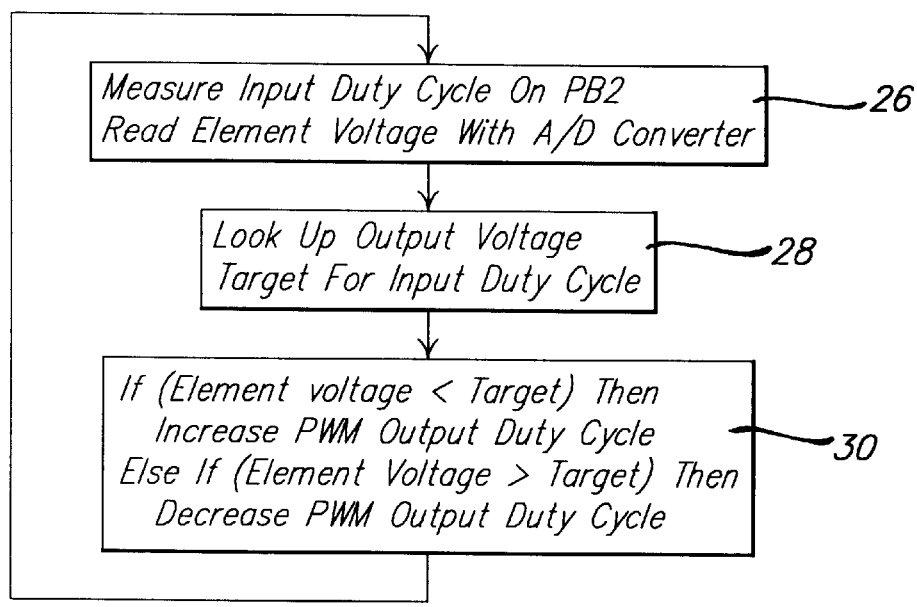
Figure 5B:
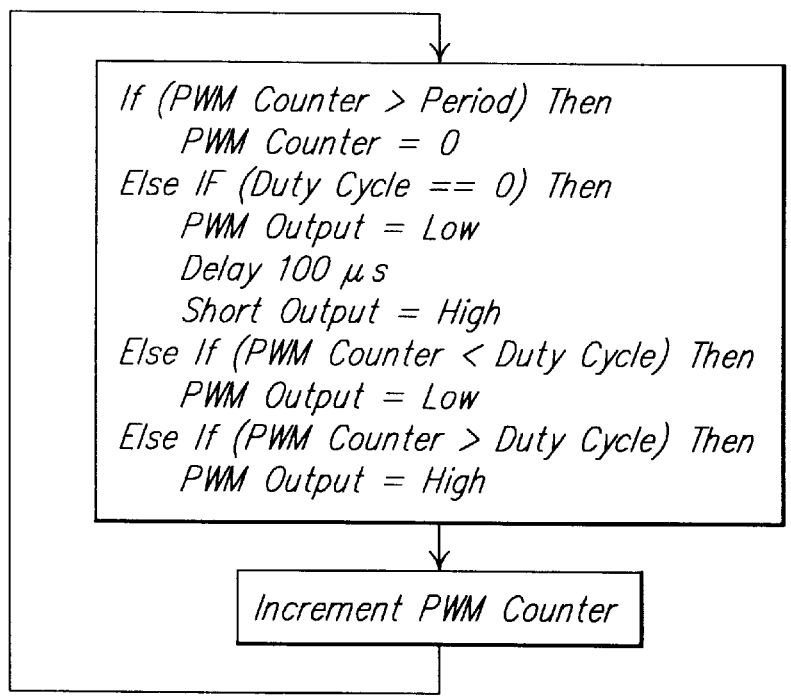

Various embodiments of the electronic circuit in accordance with the present invention are illustrated. In particular, FIG. 2 is a schematic diagram of a PWM drive circuit for an electrochromic element without PWM signal averaging which utilizes direct loading of electrochromic element to provide a reflectance characteristic of the electrochromic element which has a relatively uncompressed operating range similar to that of a DC driven electrochromic elements. In this embodiment, the PWM signal is applied to a transistor in series with the electrochromic element defining a series configuration. The software for the embodiment illustrated in FIG. 2 is illustrated in FIGS. 5a and 5b. FIG. 3 is an alternate embodiment of the invention with a shunt configuration in which the PWM signal is used to control a shunt transistor in parallel with the electrochromic element. In the embodiment illustrated in FIG. 3, the electrochromic element is loaded by shorting the electrochromic element during each cycle when the PWM signal is high. In the embodiment illustrated in FIG. 2 the electrochromic element is loaded by shorting the electrochromic element during each cycle when the output modulated signal at port PA0 is low. In contrast, known drive circuits for electrochromic elements normally provide a high impedance to the electrochromic element during portions of the cycle when the PWM signal is low. As will be discussed below, shorting the electrochromic element during conditions when the PWM signal is low actively loads the electrochromic element and improves the operating range of the reflectance characteristics.

Alternatively, as indicated by the dashed circuitry in FIG. 2 which includes a resistor R15, a capacitor C15 and voltage feedback of the electrochromic element, another alternate drive circuit can be implemented without PWM signal averaging that is configured to provide a high impedance to an electrochromic element when the PWM signal is low. In this embodiment, in order to provide an uncompressed operating range for the reflectance characteristics of the electrochromic mirror, the voltage of the electrochromic element is used as feedback in order to control the duty cycle of the PWM signal input to the electrochromic element to provide the desired reflectance characteristic.

Each of the circuits in accordance with the present invention is adapted to be used to control the reflectance of an electrochromic element as a function of the voltage across the element. Such electrochromic elements are described in detail in U.S. Pat. No. 4,902,108, assigned to the same assignee as the assignee of the present invention. Such electrochromic elements are adapted to be controlled typically between 0 and 1.2 volts to control the reflectance. As described herein, the electrochromic elements may be liquid phase self-erasing electrochromic elements. As such, in the absence of power to such electrochromic elements, the elements, such as electrochromic mirrors, become clear and operate, for example, as a normal mirror. The control circuit may be utilized to control both electrochromic mirrors used in automotive applications as well as electrochromic glass used for sunload control both in automotive applications as well as other applications. These same drive circuits could also be used with solid-state-electrochromic elements. However, presently known solid-state-electrochromic elements are not self erasing.

Referring to FIG. 2, a control circuit for controlling an electrochromic element in accordance with one embodiment of the invention is illustrated. In this embodiment, as will be discussed in more detail below, a PWM signal without averaging is used to control a transistor that is in series with the electrochromic element to an electrochromic element in contrast to FIG. 3 in which the PWM signal is used to control shunt transistor, connected in parallel with the electrochromic element.

The control circuit illustrated in FIG. 2 includes a relatively low cost 8 bit microcontroller U1, for example, a Motorola, Model No. 68HRC705J1A which includes 64 bytes of random access memory (RAM) and 1.5 kilobytes of one-time programmable read only memory (ROM). Alternatively, a microprocessor and off-chip memory devices can be used. An RC circuit which includes a resistor R12 and a capacitor C11 is used to form an oscillator which is connected to the oscillator terminals OSC1 and OSC2 of the microcontroller U1. The value of the resistor R12 determines the oscillation frequency while the capacitor C11 is used for EMI suppression. The microcontroller U1 includes a 6 bit input port PB[0:5] and an 8 bit output port PA[0:7]. A glare control signal GLARE, hereinafter input PWM signal is used to control the reflectance level of the electrochromic element EC. The input PWM signal EC may either be a n-bit asynchronous serial data signal or a PWM signal. In automotive applications, the input PWM signal may be from a door module and fed by a serial bus to the individual mirror drive circuits for each mirror (i.e. mirror modules) utilized on the vehicle. The input PWM signal is pulled up to 12 volts by a resistor R15 and applied a port PB2 on the microcontroller. A pair of resistors R2 and R14 form a voltage divider to scale the input PWM signal to 5 volts for the microcontroller U1. A bypass capacitor C6 is connected between the input PWM signal and ground for EMI protection.

The voltage supply for the microcontroller U1 is applied to a pin $V_{DD}$. The voltage supply may be derived from the 12 volt power supply within the vehicle. A diode D1 may be provided for reverse polarity protection. The diode D1 with the polarity as shown may be serially coupled to a resistor R16 which limits the current as well as drops the voltage to the power supply pin $V_{DD}$ on the microcontroller U1. A serially coupled ferrite bead E1 may be used to provide additional EMI suppression. A zener diode D2 limits the voltage to the power supply pin $V_{DD}$ on the microcontroller U1 to about 5.1 volts. A capacitor C1 may be used to maintain a relatively constant voltage to the power supply pin $V_{DD}$ on the microcontroller U1. Another capacitor C4 may be used for EMI suppression.

An interrupt pin IRQ on the microcontroller U1 is not used. Thus, the interrupt pin IRQ may be pulled up by a resistor R10. The capacitor C10 is connected to a reset pin RESET and provides the reset time constant.

An important aspect of the invention is that the electrochromic element EC is driven with a PWM signal which has not been averaged, for example, by an electrolytic capacitor. As mentioned above, by directly driving the electrochromic element EC with a PWM signal which has not been averaged, the response time of the electrochromic element is improved and the number of parts is reduced. As will be discussed in more detail below, the PWM drive signal is developed by the microcontroller U1. In this embodiment, the PWM signal is generated by software within the microcontroller U1. However, the principles of the present invention are equally applicable to microcontrollers with internal hardware PWMs and external hardware PWMs.

Figure 4:
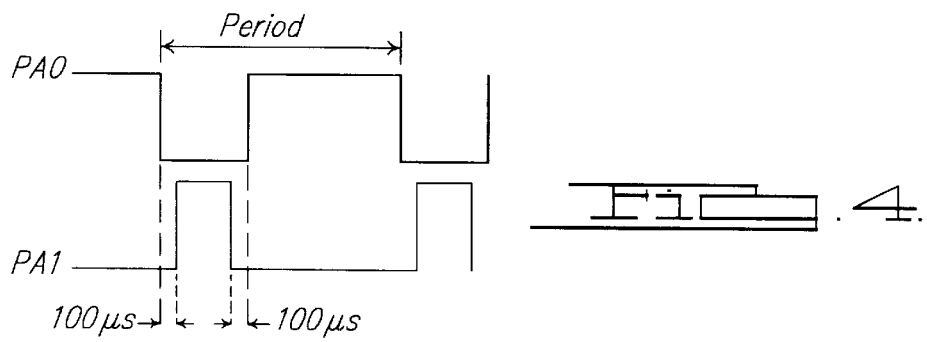
FIG. 4 is an exemplary graphical illustration of the PWM output signal and complementary control signals which form a portion of one embodiment of the present invention.

An exemplary PWM output signal, typically a variable duty cycle signal, and corresponding complementary control signal are illustrated in FIG. 4. These signals are available at the output ports PA0 and PA1 of the microcontroller U1, respectively. As illustrated in FIG. 4, the rising and falling edges of the output PWM signal from the port PA1 may be slightly offset from the corresponding control signal, available at port PA0 in order to reduce power consumption and EMI, as will be discussed in more detail.

Figure 1:
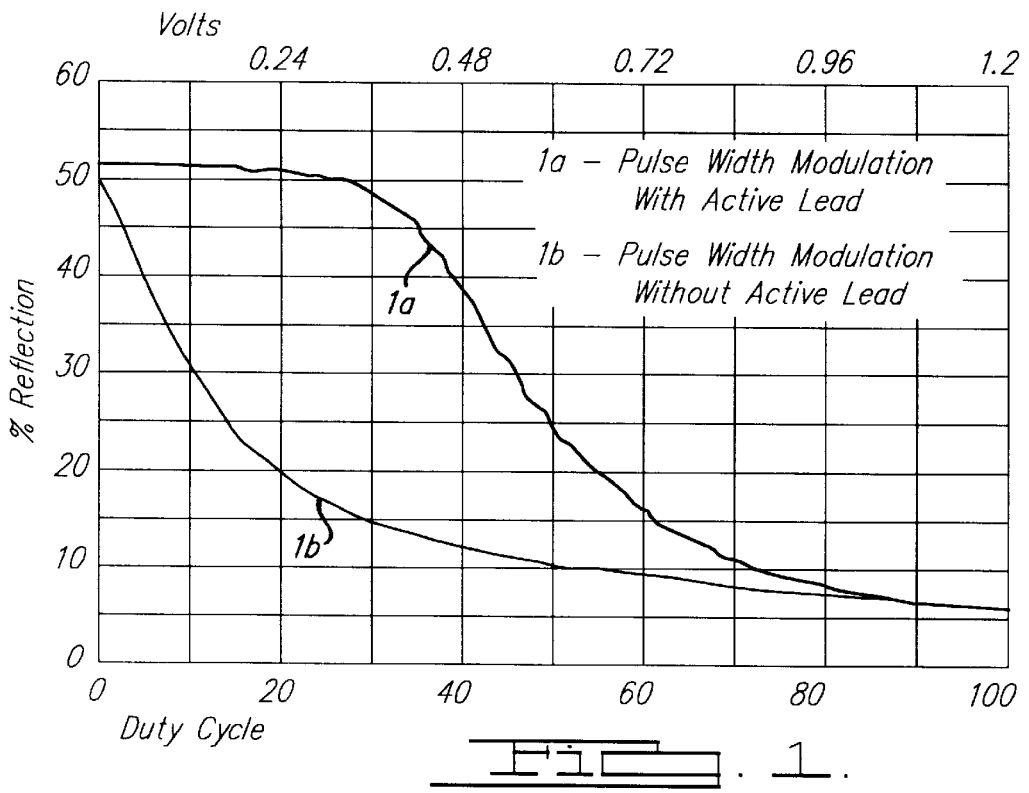
FIG. 1 is an exemplary graphical illustration of a reflectance characteristic of an electrochromic element driven by a DC signal and a superimposed exemplary graphical illustration of a reflectance characteristic of an electrochromic element driven by a PWM signal without averaging.

As mentioned above, an important aspect of the circuitry illustrated in FIG. 2 is that the control signals from ports PA0 and PA1 may be used for driving the electrochromic element EC without the need for an additional DC averaging capacitor while at the same time providing a reflectance characteristic with an operating range similar to DC driven electrochromic elements. This is done by active loading of the electrochromic element EC. More particularly, during each portion of the cycle or period when the output PWM signal is low, the electrochromic element EC is shorted by a transistor Q3, connected in parallel across the electrochromic element EC under the control of the control signal available at port PA1 of the microcontroller U1. More particularly, the transistor Q3 is driven by control signal from the output port PA1 by way of a current limiting resistor R6, connected to the base of the transistor Q3. When the control signal from the port PA1 is high, the transistor Q3 will be turned on, which, in turn, shorts out the electrochromic element EC. As discussed above, known drive circuits for electrochromic elements normally subject the electrochromic elements to a high impedance during conditions when the electrochromic element is not being driven. By shorting the electrochromic element EC during this condition, an active load is placed on the electrochromic element which acts to provide a reflectance characteristic with an operating range similar to that shown in FIG. 1A.

As mentioned above, the operating range for such electrochromic elements EC is about 1.2 volts. The power is applied to the electrochromic element EC by way of a Darlington pair Q1 connected, for example to the 12 volt vehicle power supply by way of a reverse polarity protection diode D1 and a pair of serially coupled resistors R11 and R13. The resistors R11 and R13 function as voltage dropping resistors to reduce the power dissipation of the Darlington pair Q1. The emitter terminal of the Darlington pair Q1 is coupled to the electrochromic element EC by way of a diode connected transistor Q4. A capacitor C5 may also be connected in parallel with the electrochromic element for RFI protection. As will be discussed in more detail later, the diode connected transistor Q4 as well as pair of resistors R5 and R7 are used to provide temperature compensation. In embodiments when such temperature compensation is utilized, the emitter voltage of the Darlington pair may be controlled to be about 1.9 volts, which will provide a full scale 1.2 volts at the electrochromic element, considering the approximately 0.7 voltage drop across the diode connected transistor Q4.

A feedback circuit which includes a resistor R3, a resistor R4, a resistor R5, a resistor R1 and a transistor Q2 is used to maintain a emitter voltage of the Darlington pair Q1 at approximately 1.9 volts as discussed above. More particularly, in order for voltage and current to be supplied to the electrochromic element EC, the port PA0 must be high while the port PA1 is low. Under these conditions, the bases of the transistors Q2 and Q3 are held low through the resistors R1 and R6 respectively, keeping the transistors Q2 and Q3 in a non-conducting mode. During this condition, base current for the Darlington pair Q1 flows through a resistor R4, causing a change in the Darlington pair Q1 emitter current, which, in turn, is applied to the electrochromic element EC by way of the diode connected transistor Q4. As mentioned above, in order to maintain the approximately 1.2 volts to the electrochromic element, approximately 1.9 volts must be maintained at the emitter of the Darlington pair Q1. In order to maintain this voltage, the transistor Q2 is biased by way of a voltage divider formed by a resistor R3 and a resistor R1 which determines the cut in point at which the transistor Q2 becomes active. More particularly, the transistor Q2 is connected to shunt a portion of the base current away from the Darlington pair Q1 when the emitter voltage of the Darlington pair Q1 exceeds 1.9 volts. By shunting a portion of the base current away from the transistor Q1, the emitter current of the Darlington pair Q1 is decreased thereby decreasing the voltage appearing at the emitter to thus maintain the required voltage of approximately 1.2 volts at the electrochromic element. The resistor R5 is selected to determine the amount of current to be shunted away from the Darlington pair.

The varying duty cycle PWM signal, applied to the electrochromic element EC, is used to directly control the EC reflectance level. In particular, in accordance with the present invention the electrochromic element EC is used to directly average the PWM signal without the need for an additional capacitor to control the reflectance. During the conditions when the PWM signal from the port PA0 is low, the output signal from the port PA1 is driven high which turns on the transistor Q3, which, in turn, shorts out the electrochromic element EC. As mentioned above, by shorting out the electrochromic element during conditions when the PWM signal is low, the characteristics of the reflectance curve and in particular the operating range for a direct PWM drive is similar to that of a DC driven electrochromic element.

The capacitors C7 and C8 are connected to the bases of the transistors Q1 and Q3 respectively for EMI suppression. The capacitors C5 and C7 also limit the gain of the circuit at high frequencies and thus stabilize the circuit. The capacitors C7 and C8 have an effect on the turn on and turn off times of the transistors Q1 and Q3, respectively. In order to account for this effect and to reduce the power dissipation of the circuit, the control signal from the port PA1 is slightly offset relative to the output PWM signal, as illustrated in FIG. 4. These offsets or deadtimes allow time for the transistor Q1 to turn off before the transistor Q3 turns on and vice versa.

As mentioned above, a diode connected transistor Q4 is used to compensate for the temperature variation of the base emitter voltage $V_{be}$, for the transistor Q2. More particularly, it is known that the base emitter voltage $V_{be}$, of a transistor decreases approximately 2.5 millivolts per degree Kelvin. The diode connected transistor Q4 compensates for this effect by providing an additional voltage drop as temperature decreases of about 2.5 millivolts per degree Kelvin to maintain a relatively constant voltage at the emitter of the transistor Q4.

Flow charts for the microcontroller U1 for the embodiment illustrated in FIG. 2 are provided in FIGS. 5A and 5B. As mentioned above, the microcontroller U1 may be provided with a one time programmable ROM which may be used to store a look up table for converting the glare control signal GLARE, applied to port PB2 (input PWM signal) of the microcontroller U1 to a corresponding duty cycle that is output on port PA0 microcontroller U1, defining an output PWM signal. Referring first to FIG. 5A, initially in step 20, the duty cycle of the input PWM signal is measured. In step 22, the input cycle is then applied to a look up table to determine the corresponding duty cycle of the output PWM signal to be provided at port PA0 of the microcontroller U1. After the duty cycle of the output PWM signal is determined, it is generated on port PA0 in step 24.

As discussed above, the PWM signal may be software generated or alternatively generated by hardware PWM within the microcontroller U1. FIG. 5B illustrates a software program for providing a software output PWM signal at the microcontroller port PA0. As used in FIG. 5B, the PWM output refers to the output at port PA0 of the microcontroller U1 while the short output refers to the output at the port PA1 of the microcontroller. As discussed above, in order to reduce power dissipation, the PWM prevents the transistors Q1 and Q3 from being turned on at the same time and thus generates signals at the output ports PA0 and PA1 with small offsets or deadtimes as illustrated in FIG. 4. Initially, the PWM counter determines if the count is greater than the period; the period being the number of clock cycles in the PWM output signal, i.e the time between falling edges of the PWM output signal as illustrated in FIG. 4. Referring back to FIG. 5b, if the value of the PWM counter is greater than the period, then the PWM output signal at the port PA1 is set low. As discussed above, when the PWM output signal from the port PA0 is set low, the Darlington pair Q1 is turned off. In order to prevent the shorting transistor Q3 from being turned on prior to the Darlington pair Q1 being fully turned off, the system delays, a predetermined amount of time, for example, 100 $\mu v$ sec. prior to setting the short output (i.e. the output at port PA1 high). Required deadtimes depend of the values of C7 and C8 or the storage times of Q1 and Q3 for small values of C7 and C8. The PWM counter is then set to 0.

As mentioned above, the duty cycle of the PWM output signal is determined from a look up table stored in the one time programmable ROM on-board the microcontroller U1. If the value of the PWM counter is less the value of the duty cycle of the PWM output signal, the output PWM output signal is maintained low and the short output is maintained high. During this condition, the Darlington pair Q1 is maintained off while the shorting transistor Q3 is turned on, thus shorting out the electrochromic element EC.

When the value of the PWM counter is greater than the duty cycle, the PWM output at the port PA0 is set high while the short output at the port PA1 is set low. During this condition, the Darlington pair Q1 is turned on and the transistor Q3 is turned off.

During conditions when the PWM counter is equal to the duty cycle, the short output is set low, which, as mentioned above, is used to turn off the transistor Q3. In order to provide plenty of time for the transistor Q3 to turn off before the Darlington pair Q1 is turned on, a predetermined delay, such as 100 $\mu sec.$, is used to delay the PWM output signal at port PA0 going high after the transistor Q3 is turned off. After each cycle the PWM counter is incremented and the loop is repeated.

As mentioned above, the circuit illustrated in FIG. 2 as well as the software illustrated in FIGS. 5A and 5B is used to provide active loading of the electrochromic element in order to provide a reflectance characteristic for the electrochromic element similar to that for a DC driven electrochromic element. Alternatively, a PWM driven electrochromic element without PWM signal averaging can also be forced to provide a reflectance response characteristic similar to that of a DC driven electrochromic element by voltage feedback in order to control the voltage of the electrochromic element. Also, in contrast to the embodiment discussed above, rather than short the electrochromic element during periods when the PWM signal is low, in the embodiment utilizing voltage feedback the electrochromic element EC is floated (i.e. subject to a high impedance). The transistor Q3 in this embodiment is merely used to go to a clear condition when glare control is not required. In this embodiment, the circuitry is identical to FIG. 3 and further includes the circuitry shown dotted, and in particular, the additional resistor R15, the additional capacitor C15 and the voltage feedback is provided from the electrochromic element EC back to the microcontroller U1. In this embodiment, the microcontroller U1 in this embodiment includes an analog to digital converter (ADC). A suitable microcontroller with an ADC is a Motorola Model No. 68HC705JJ6. The voltage from the electrochromic element EC is applied to an ADC port AD1 by way of a resistor R15. The flow charts for this embodiment are illustrated in FIGS. 6A and 6B.

A resistor R15 and a capacitor C15 may be used to average the voltage on the element so that the ADC in the microprocessor can measure a substantially constant voltage proportional to the average element voltage. The time lag between the element voltage and the ADC input can actually be beneficial as it tends to create overshoots on the average element voltage which can improve the EC element's response time. In some cases it may be useful to use a relatively large value for the R15-C15 time constant to produce compensating overshoots on the average element voltage for decreased element response time.

Alternatively, the resistor R15 and the capacitor C15 can function as an anti-alias filter with an RC time constant of about 47 ms and the long time constant for overshoot generation can be generated in software with a digital filter. A first order IIR type is normally preferred for simplicity. A digital low-pass filter of this type can be implemented in software using the general form of $H(z)=\gamma[(\alpha(z+1)/(z+\beta)]$. For example: for $\alpha=0.059$, $\beta=0.88$, $\gamma=1.0$ and a sampling rate 100 ms the 3 dB down frequency would be about 0.2 Hz. Other coefficients and filter types are usable depending upon the desired response of the system.

Referring to FIG. 6A, initially, in step 26 the duty cycle of the input PWM signal, applied to port PB2 of the microcontroller U1, is measured. In addition, the voltage of the electrochromic element EC is read at the ADC port AD1. In this embodiment, in addition to storing corresponding duty cycles, target voltages for the electrochromic element EC are also stored in the look up table discussed above. As such, in step 28 a target output voltage for the input PWM is looked up. If the voltage, of the electrochromic element EC is less than the target voltage, the system increases the duty cycle of the output PWM signal (i.e duty cycle of signal at port PA0) in order to increase the voltage of the electrochromic element EC. Similarly, if the voltage of the electrochromic element EC is greater than the target voltage, the duty cycle of the output PWM signal is decreased as illustrated in step 30.

The flow chart for the software PWM for this embodiment is illustrated in FIG. 6B. Initially, the system determines if the PWM counter is greater than the period or cycle of the output PWM signal. If so, the PWM counter is set to 0. In this embodiment, the transistor Q3 is only used to short the electrochromic element when glare control is not required. Thus if the duty cycle is equal to 0, the output PWM signal at port PA0 is set low. When the port PA0 is low, the Darlington pair Q1 is turned off. In order to provide sufficient time for the Darlington pair Q1 to turn off prior to the transistor Q3 turning on to short the electrochromic element, a predetermined delay, such as 100 μsec. is used to delay the signal at the port PA1 from going high. If the system determines that the PWM counter is less than the duty cycle, the PWM output is maintained low in order to float the electrochromic element EC (i.e subject the electrochromic element EC to a high impedance). Otherwise if the PWM counter is greater than the output duty cycle, the PWM output is set high to drive the electrochromic element EC.

An alternate embodiment of the invention is illustrated in FIG. 3. In this embodiment, a PWM signal is used to control a transistor Q1B that is connected in parallel with the electrochromic element EC defining a shunt configuration. In this embodiment, a 12 volt supply $V_{BAT}$ is applied to the electrochromic element EC by way of a transistor Q1A, a pair of resistors R1A and R2A and a diode D1A. The diode D1A provides reverse polarity protection. The resistors R1A and R2A may be used for current limiting as well as to drop the voltage to the electrochromic element EC. The transistors Q1A and Q2A along with the resistors R3A and R4A form an enable switch for supplying power to the electrochromic elements EC. The enable switch is under the control of a logic signal illustrated as $V_{LOGIC}$, which may be a dc voltage or a modulated signal, such as a PWM signal. When the logic signal $V_{LOGIC}$ is high, the transistor Q2a is turned on which, in turn, turns on the transistor Q1a and applies power to the electrochromic element EC. A transistor Q1B is connected in parallel with the electrochromic element EC forming a shunt around a electrochromic element EC. The transistor Q1B is controlled by a PWM signal $V_{PWM}$ which pulse width modulates the base of the transistor Q1B by way of resistor R5A. The resistors R5A and R6A are used to set the maximum voltage that appears across the electrochromic element EC. When the PWM signal $V_{PWM}$ is high, the transistor Q1B is turned on, thus forming a shunt, actively loading the electrochromic element EC. When the PWM signal $V_{signal}$ is low, the collector current of the transistor Q1B is at its minimum value, thereby allowing a voltage to develop across the electrochromic element from the power supply $V_{BAT}$. In this embodiment, similar to the embodiments discussed above, the electrochromic element EC is controlled as a function of the duty cycle of the PWM signal $V_{PWM}$. However, during conditions when the PWM signal is high, the electrochromic element EC is actively loaded. As discussed above, by actively loading the electrochromic element EC during periods when the PWM signal is high, the reflectance characteristic of the PWM driven electrochromic element is similar to the reflectance characteristic of a DC driven electrochromic element EC.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A drive circuit for driving an electrochromic element, the drive circuit comprising:

means for generating a modulated signal having a variable duty cycle defining a low logic state during each cycle and a high logic state during each cycle; and means for driving said electrochromic element with said modulated signal when said modulated signal is in one or the other of said logic states and shorting said electrochromic element when said modulated signal is in the other of said logic states irrespective of the voltage of said electrochromic element.

2. A drive circuit as recited in claim 1, wherein said driving means includes a drive transistor serially coupled between said electrochromic element and a source of DC power.

3. A drive circuit as recited in claim 1, wherein said driving means includes a shunt transistor connected in parallel with said electrochromic element.

4. The drive circuit as recited in claim 2, wherein said shorting means includes a shunt transistor connected in parallel with said electrochromic element.

5. The drive circuit as recited in claim 4, further including means for delaying the turn on of said shunt transistor for a first predetermined time period after a turnoff of said drive transistor has been initiated.

6. The drive circuit as recited in claim 5, further including means for delaying the turn on of said drive transistor for a second predetermined time after said turn off of said shunt transistors has been indicated.

7. The drive circuit as recited in claim 6, wherein said first and second predetermined time periods are equal.

8. The drive circuit as recited in claim 7, wherein said predetermined time period is about 100 μsec.

9. The drive circuit as recited in claim 1, wherein said generating means includes a microprocessor having a plurality of output ports, wherein said modulated signal is available at one of said plurality of output ports during one logic state of said modulated signal.

10. The drive circuit as recited in claim 9, wherein a shorting signal is generated at another one of said plurality of output ports, said shorting signal used to short said electrochromic element during alternate states of said logic signal.

11. The drive circuit as recited in claim 1, wherein said modulated signal is a pulse width modulated signal.

12. A drive circuit for driving an electrochromic element, the drive circuit comprising:

means for generating a modulated signal having a variable duty cycle defining a low logic state during each cycle and a high logic state during each cycle;

means for monitoring the voltage of said electrochromic element; and means for controlling the electrochromic element as a function of the duty cycle of said modulated signal and the voltage of said electrochromic element during one or the other of low logic state or said high logic state and open circuiting said electrochromic element during the other of said logic states.

13. The drive circuit as recited in claim 12, wherein said controlling means includes means for subjecting said electrochromic element to a high impedance during low portions of each cycle of said modulated signal.

14. The drive circuit as recited in claim 13, further including means for storing ideal voltage values of said electrochromic element at various duty cycles of said modulated signal and means for varying said duty cycle to meet said ideal voltage values.

15. The drive circuit as recited in claim 14, further including means for adjusting the duty cycle of said modulated signal as function of the voltage of said electrochromic relative to said ideal voltage values.

16. The drive circuit as recited in claim 12, further including a shunt transistor, connected in parallel with said electrochromic element, for shorting said electrochromic element when said logic state is in one or other of said logic states.

17. The drive circuit as recited in claim 12, wherein said modulated signal is a pulse width modulated signal.

18. A drive circuit for an electrochromic element, the drive circuit comprising:

an enable switch serially coupled between a DC source and said electrochromic element for applying a predetermined signal to said electrochromic element when said enable switch is enabled and disconnecting said DC voltage from said electrochromic element when said enable switch is disabled;

means for controlling said enable switch;

a shunt transistor connected in parallel with said electrochromic element; and means for generating a modulated signal, said modulated signal used to drive said shunt transistors.

19. The drive circuit as recited in claim 8, wherein said enable switch includes one or more transistors.

20. The drive circuit as recited in claim 18, wherein said modulated signal is a pulse width modulated signal.

21. A drive circuit for driving an electrochromic element, the drive circuit comprising:

means for generating a modulated signal having a variable duty cycle defining a low logic state during each cycle and a high logic state during each cycle;

means for monitoring and averaging the voltage of said electrochromic element; and means for controlling the electrochromic element as a function of the duty cycle of said modulated signal and the average voltage of said electrochromic element.

* * * * *